United States Patent [19]
Staats et al.

[11] Patent Number: 5,809,331
[45] Date of Patent: Sep. 15, 1998

[54] SYSTEM FOR RETRIEVING CONFIGURATION INFORMATION FROM NODE CONFIGURATION MEMORY IDENTIFIED BY KEY FIELD USED AS SEARCH CRITERION DURING RETRIEVAL

[75] Inventors: Erik P. Staats, Brookdale; Robin D. Lash, Milpitas, both of Calif.

[73] Assignee: Apple Computer, Inc., Cupertino, Calif.

[21] Appl. No.: 626,462

[22] Filed: Apr. 1, 1996

[51] Int. Cl.⁶ .............................. G06F 13/00; G06F 13/24; G06F 13/36
[52] U.S. Cl. .......................... 395/830; 395/500; 395/872; 395/284; 395/681
[58] Field of Search .................................. 395/651, 681, 395/872, 830, 500, 284

[56] References Cited

U.S. PATENT DOCUMENTS

| | | | |
|---|---|---|---|
| 4,020,466 | 4/1977 | Cordi et al. | 340/172.5 |
| 5,202,986 | 4/1993 | Nickel | 395/600 |
| 5,343,471 | 8/1994 | Cassagnol | 370/85.13 |
| 5,586,268 | 12/1996 | Chen et al. | 395/250 |
| 5,598,563 | 1/1997 | Spies | 395/652 |
| 5,630,076 | 5/1997 | Saulpaugh et al. | 395/284 |
| 5,713,009 | 1/1998 | DeRosa, Jr. et al. | 395/500 |

OTHER PUBLICATIONS

ISO/IEC 13213 ANSI/IEEE Standard 1212, "Information Technology—Microprocessor Systems—Control and Status Registers (CSR) Architecture For Microprocessor Buses", First Edition, pp. 1–125, (Oct. 5, 1994).

Philips Electronics et al, Digital Interface for Consumer Electronic Audio/Video Equipment Draft Version 2.0, IEEE 1394 Trade Association Meeting, pp. 1–47, Part 2—pp. 1–6, (Oct. 1995).

High Performance Serial Bus Working Group of the Microprocessor and Microcomputer Standards Committee, "P1394 Standard for a High Performance Serial Bus", P1394 Draft 8.0v3, pp. 1–364, (Oct. 16, 1995).

Apple Computer, "Inside Macintosh, Devices", Nov. 1994, pp. 3.1–3.48.

"Information Technology—Microprocessor Systems—Control and Status Registers (CSR) Artchitecture for Microcomputer Buses" IEEE 1212, 1994.

"Standard for a High Performance Serial Bus", IEEE 1394, Oct. 1995, pp. ii–364.

Apple Computer, "Designing PCI Cards and Drivers for Power Macintosh Computers", Mar. 1995, pp. 1–366.

Apple Computer, Inc., "Interim Draft, Designing PCI Cards and Drivers for Power Macintosh Computers", A8 Draft—Preliminary Information, pp. 1–372, (Mar. 9, 1995).

*Primary Examiner*—Thomas C. Lee
*Assistant Examiner*—Rehana Perveen
*Attorney, Agent, or Firm*—Blakely, Sokoloff, Taylor & Zafman

[57] ABSTRACT

A computer system comprises a plurality of nodes interconnected by point-to-point links and forms a serial bus. Upon system initialization, the bus is scanned and device-specific identification information is retrieved from command and status configuration ROMs associated with each of the plurality of nodes. In one embodiment, a search routine is used to retrieve the device specific information. The search routine begins with the definition of an iterator which is used as a place holder during the search. A simple search begins at the root directory of a hierarchical tree data structure and continues until all directories within the tree have been searched. In more complex embodiments, search relationships (i.e., direction) parameters are defined. Search criteria such as node spec_ID and software version numbers are specified and the search is commenced. The search continues until all matching device specific information entries have been returned. The device specific information can be used to load and configure associated drivers for nodes.

12 Claims, 4 Drawing Sheets

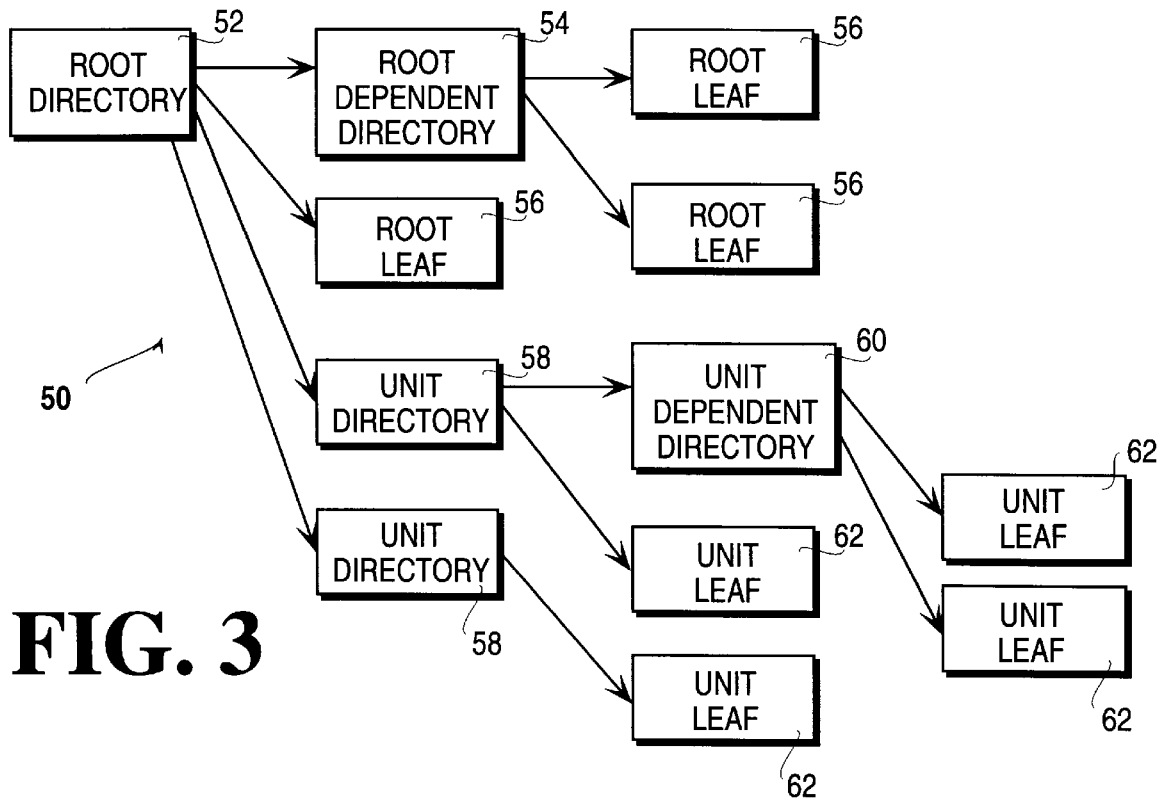
FIG. 3
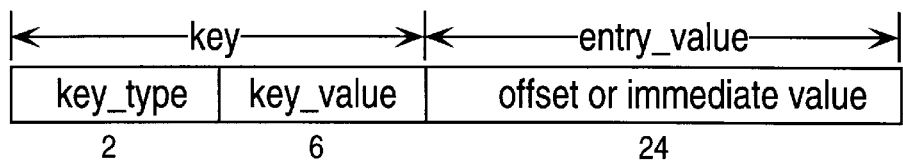
FIG. 4
FIG. 5

SYSTEM FOR RETRIEVING CONFIGURATION INFORMATION FROM NODE CONFIGURATION MEMORY IDENTIFIED BY KEY FIELD USED AS SEARCH CRITERION DURING RETRIEVAL

FIELD OF THE INVENTION

This invention relates generally to computer systems and, more particularly, to searching and retrieving information contained in hierarchical tree data structures maintained within computer systems.

BACKGROUND

Computer systems are comprised of a variety of different components or "devices" that operate together to form the resultant system. Typically, some of the devices are supplied with the computer system initially, such as the central processing unit, and some devices can be installed into the computer system after the initial configuration of the system. The devices of the computer system are generally coupled together via interconnects which may be of several types. Common interconnects include SCSI, ADB and serial connections.

One type of system interconnect is described by IEEE Standards Document 1394, entitled *Standard For A High Performance Serial Bus* (hereinafter the "IEEE 1394 Serial Bus Standard"). A typical serial bus having an IEEE 1394 standard architecture is comprised of a multiplicity of nodes that are interconnected via point-to-point links, such as cables, that each connect a single node of the serial bus to another node of the serial bus. The nodes themselves are addressable entities which can be independently reset and identified. Nodes are associated with respective components of the computer system and serve as interfaces between the components and the communications links. Nodes are logical entities, each with a unique address. In a preferred implementation, each node provides an identification ROM and a standardized set of control registers whch can be accessed by software residing within the computer system.

For a general computer system having a number of devices, each device has an associated driver that, among other functions, configures the device and allows the device to be operable within the overall system. Drivers are typically software instructions that can be loaded into the computer's memory and, when executed, will communicate with the device to properly configure the device for operation. The driver may initialize the device so that the device can function and the driver may also allow the device to communicate within the overall system. Since installed devices can be altered and since new devices can be inserted into a configured computer system, it becomes important to match the proper driver to the proper device for reliable operation of the computer system.

SUMMARY OF THE INVENTION

The present invention provides a mechanism and method for automatically searching and retrieving device-specific identification and configuration information from logical units of a computer system. This information can be used to load and configure the appropriate driver for the device associated with each logical unit.

In one embodiment, the present invention provides a search routine which, when executed by a processor, causes the processor to recursively search the control and status registers (CSRs) of a configuration ROM of a node on a computer bus and retrieve specified search criteria. The search criteria can include the node Spec_ID and software version information, thus allowing for proper driver loading and configuration. The search routine is capable of searching a hierarchical directory structure within each configuration ROM and is capable of searching in a plurality of directions.

These and other features of the present invention will become clear with reference to the attached drawings and the detailed description provided herein.

BRIEF DESCRIPTION OF THE DRAWINGS

The present invention is illustrated by way of example and not limitation in the figures of the accompanying drawing, in which like references indicate similar elements, and in which:

FIG. 3 illustrates the general ROM format for a configuration ROM of a serial bus according to one embodiment;

FIG. 4 shows the format of a typical directory within a node configuration ROM according to one embodiment;

FIG. 5 illustrates the format of a directory entry in a configuration ROM according to one embodiment.

DETAILED DESCRIPTION

A method and apparatus for searching and retrieving data from hierarcical tree data structures maintained within computer systems is described. In one embodiment, the method is applied to a search of control and status registers (CSRs) of configuration ROMs in a computer system. The bus architecture described herein, though described with reference to a preferred embodiment comprising components for a single computer, in general has a broader scope and could include test and measurement systems, positioning and robotic systems, and audio and video components, for example. The present invention may be applied to any arbitrarily assembled collection of nodes linked together as in a network of devices. It must also be noted that it is necessary to distinguish a node from a logical unit. Each node to reside on the bus will have associated with it at least one logical unit. In certain circumstances, a given node may be associated with multiple logical units. Usually however, there will be a one-to-one correspondence between logical units and nodes on the bus.

Figure 1:
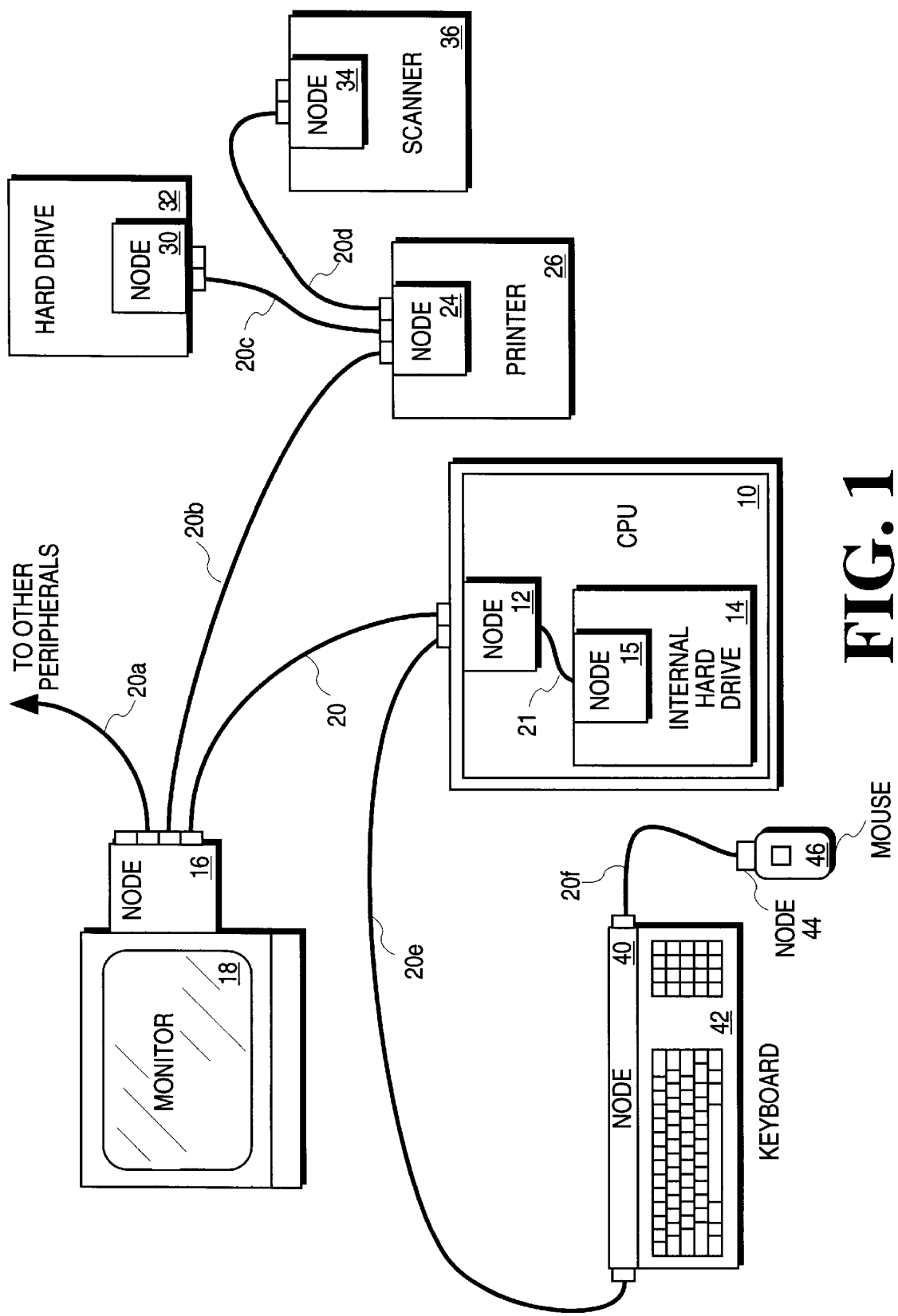
FIG. 1 shows a computer system having a serial bus made up of a number of nodes.

Procedures of the present invention to be described operate within the environment of a computer system 5 as shown in FIG. 1. Although described with reference to a computer system 5 generally constructed in accordance with the IEEE 1394 Serial Bus Standard, the present invention is applicable to any computer system that implements the CSR configuration ROM architecture described in IEEE Standards Document 1212, 1994 edition, entitled *Information Technology—Microprocessor Systems—Control and Status Registers (CSR) Architecture for Microcomputer Buses*.

Computer system 5 of FIG. 1 comprises a central processing unit (CPU) 10, a monitor 18, a printer 26, a hard drive 32, a scanner 36, a keyboard 42, and a mouse 46. The CPU 10 includes an internal hard drive 14 and a memory (not shown). Each of the devices of the computer system is coupled to a node of the serial bus. In general, the device to which a node is coupled acts as the "local host" for that node. For example, the CPU 10 is the local host for the CPU node 12; the monitor 18 is the local host for the monitor node 16; the printer 26 is the local host for the printer node 24; the hard drive 32 is the local host for the hard drive node 30; the scanner 36 is the local host for the scanner node 34; the keyboard 42 is the local host for the keyboard node 40; the mouse 46 is the local host for the mouse node 44; and the internal hard drive 14 is the local host for the internal hard drive node 15. It is not necessary for every node to have a local host, nor is it necessary that the local host always be powered.

A point-to-point link such as cable 20 is used to connect two nodes to one another. The CPU node 12 is coupled to internal hard drive node 15 by an internal link 21, to monitor node 16 by cable 20, and to a keyboard node 40 by a cable 20e. The keyboard node 40 is coupled to the mouse node 44 by cable 20f. The monitor node 16 is coupled to the nodes of other peripherals (not shown) by cable 20a and to the printer node 24 by cable 20b the printer node 24 is coupled to the hard drive node 30 by cable 20c and to the scanner node 34 by cable 20d. Each of the cables 20–20f in the internal link 21 may be constructed in accordance with the IEEE 1394 Serial Bus Standard and includes a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of the particular local host. For example, each node has one or more ports, the number of which is dependent upon its needs. For example, CPU node 12, as illustrated, has three ports, while the mouse node 44 has only one port.

Each of the nodes 12, 15, 16, 24, 32, 34, 40 and 44 provides an address space which can be directly mapped to one or more units. A unit is a logical entity, such as a disk controller, which corresponds to unique input/output (I/O) driver software. A unit may be defined by a unit architecture which defines the format and function of the unit's software visible registers. Within a unit there may be multiple subunits, which can be accessed through independent control registers or uniquely addressed DMA-command sequences.

The serial bus of computer system 5 may be adapted for use in different types of electronic systems. For example, the serial bus may be used to interconnect the components of an audio/visual electronic system wherein the local hosts may include a video camera, a video recorder, a video monitor, and an audio amplifier.

Figure 2:
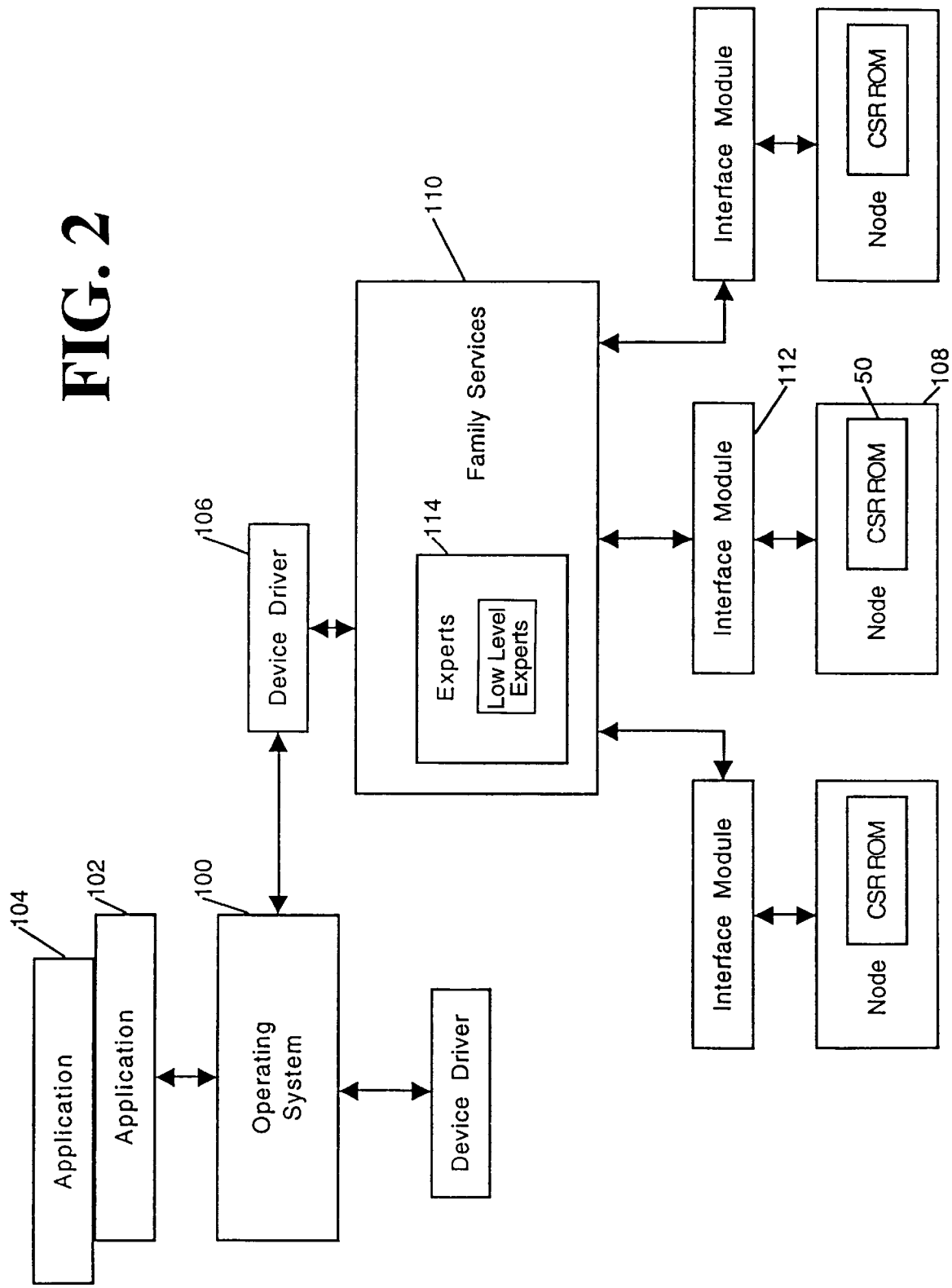
FIG. 2 illustrates the software architecture for a computer system according to one embodiment.

FIG. 2 illustrates a typical software architecture for the computer system 5 for one embodiment. The computer system 5 software includes an operating system 100 that supports a set of application programs, including a pair of application programs 102 and 104, and a set of device driver programs for the resident and removable devices (i.e., nodes) of the computer system 5. Operating system 100 is generally stored in system memory and takes care of basic functions within computer system 5 such as handling interrupts, moving data to and from memory and peripheral devices and managing memory space. To accomplish these functions, operating system 100 provides multiple execution enviornments at different levels, such as task level, interrupt level, etc., as is known in the art.

Application programs, such as application program 102, generally reside in system RAM when operating and often access system resources, such as input/output (I/O) devices. These system resources are often referred to as services. To gain access to I/O resources (nodes), application programs, such as application program 102, generate service requests which are typically sent through application programming interfaces (APIs). The service requests are converted by the API to a common set of functions that are forwarded to an operating system, such as operating system 100, to be serviced. The operating system then sees that the service requests are answered by the appropriate resources (i.e., node).

Logical device driver 106 functions as a device driver program to node 108. The logical device driver 106 processes read, write, and other commands from the application program 102 which are transferred by operating system 100. The logical device driver 106 communicates with the node 108 through a set of family services 110 functions and a set of interface module 112 functions.

It is known in the art to provide a set of family services as interfaces between the computer operating system and logical device drivers on the one hand and physical devices of the computer system on the other hand. A device family is a collection of devices (i.e., nodes) that provide the same kind of I/O functionality. For example, the set of SCSI devices comprise the SCSI family. Likewise, nodes which conform to the IEEE 1394 Serial Bus Standard form a family of devices. In general, each family defines a family programming interface (FPI) designed to meet the particular needs of that family. An FPI provides access to a given family's services. For the example shown in FIG. 2, the family services 110 provide a set of system functions that enable application programs and device driver programs on the computer system 5 to access the removable devices coupled to the bus.

The family services 110 comprises a set of experts 114. Experts can be high level experts or low level experts. In general, experts are code which connect a family of devices to the operating system. More particularly, low level experts are software entities that install entries in a data base maintained by the computer operating system. The purpose of these entries is to provide enough information to permit device control and driver matching within computer system 5. The manner in which this is accomplished is described below for one embodiment. Those skilled in the art will recognize that the data base which maintains this information is generally referred to as a Name Registry, as fully described in the document entitled *Designing PCI Cards and Drivers for Power Macintosh Computers*, available through the Apple Developer's Catalog, formerly APDA, part R0650LL/A. Low level experts may reside in system firmware, node firmware, or within the operating system.

For an embodiment conforming to the IEEE 1394 Serial Bus Standard, each transaction capable node 12, 15, 16, 24, 32, 34, 40 and 44 of the serial bus implements a configuration ROM. The configuration ROM is a nonvolatile memory which stores critical boot information which is accessed during bus initialization as described below. The boot information is stored in the Name Registry and used to identify the appropriate driver software to be loaded for the node of interest.

FIG. 3 illustrates the general ROM format for each configuration ROM 50 of the serial bus. For one embodiment, the node configuration ROMs 50 reside within the address space of the serial bus in accordance with the IEEE 1394 Serial bus Standard. As shown, the configuration ROM 50 is divided into a root directory 52, various root dependent directories 54, root leafs 56, unit directories 58, unit dependent directories 60, and unit leafs 62. Thus, the directories are arranged in a hierarchical fashion. Within this structure, directories may have "children", "parents" and "siblings".

Entries within the root directory 52 may provide information or may provide a pointer to another directory (e.g., a root dependent directory 54) which has the same structure as the root directory, or to a root leaf 56 which contains information. The unit directories 58 contain information about each unit, such as its software version number and its location within the node's address space. The software version number and spec_ID are used to uniquely identify the appropriate driver software for the node.

All directories in the node configuration ROMs 50 have the format shown in FIG. 4. The directory length parameter specifies the number of following quadlet entries in the directory. Each directory entry then has the format shown in FIG. 5. Each directory entry is broken down into a key field and an entry value field. The key field itself has two fields: the key type, indicating the type of directory entry, and the key value, specifying the particular directory entry, e.g., spec_ID, unit software version, etc. The key type definitions for a preferred embodiment according to the IEEE 1394 Serial Bus Standard are shown in Table 1, below.

| Reference Name | Key Type | Meaning of Least Significant 24-bits |
| --- | --- | --- |
| Immediate | 0 | Intermediate Value |
| Offset | 1 | Initial Register Space Offset for an Immediate Value |
| Leaf | 2 | Indirect Space Offset for a Leaf |
| Directory | 3 | Indirect Space Offset for a Directory |

For an immediate entry, the entry value is the 24-bit value for that directory entry. Its meaning is dependent on the type of entry. For an offset entry, the entry value contains a 24-bit offset field. The offset value specifies a CSR address as a quadlet offset from the base address of the initial register space. For the leaf and directory entries, the entry value provides a 24-bit indirect offset value which specifies the address of the leaf or directory of the indirect space. The indirect offset value indirectly specifies the ROM offset address of the leaf or the directory. Thus, using the key type and key value, a specific entry in the configuration ROM 50 of a node on the serial bus can be identified.

The present invention provides a method for searching the configuration ROMs 50 of the nodes on a serial bus. In one embodiment, a method of searching for and retrieving node software version and spec_ID information is provided. This information can then be used by computer system 5 to load appropriate driver software for the nodes of the bus.

The search routine, in one embodiment, is provided with a pointer to the CSR configuration ROM of a specified node within the address space of the serial bus. Search parameters are defined. The search parameters correspond to the key types and key values defined for the node software version number and spec_ID. Using these parameters, the search routine scans the address space of the configuration ROM and returns with matches for the given search parameters.

```
Key Search Criteria
{search type = key search;
    key type;
    key hi;
    key lo;
```
-continued
```
};
Unit Dir Criteria
{search type = Key search;
    key type = Dir type;
    key hi;
    key lo = unit dir key;
};
Unit Spec ID Criteria
{search type = key search;
    key type = immediate;
    spec_ID key;
};
Unit SW Version Criteria
{search type = key search;
    key type = immediate;
    SW Version key;
};
```

Figure 6:
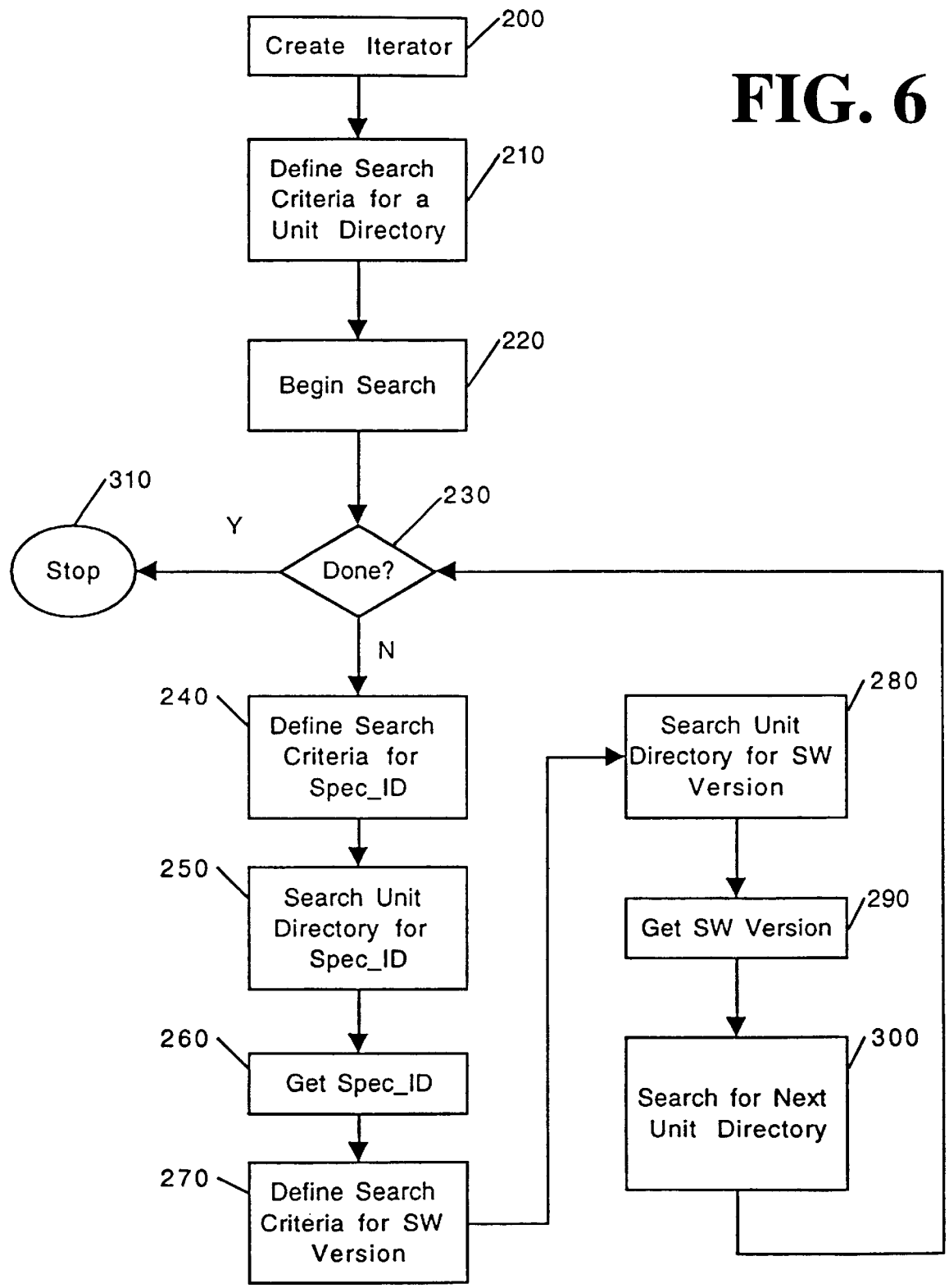
FIG. 6 is a flow diagram showing a configuration ROM search routine according to one embodiment.

FIG. 6 provides a flow diagram for the above search routine. At step 200, an iterator is created to be used as a place holder during the search. Unless otherwise specified (see the general search routine below), the iterator defaults to a setting to allow a search of the entire configuration ROM 50 of the specified node (by referenceID). That is, the search will begin at the root directory (see FIG. 3) and continue through all directories and leafs in the configuration ROM. At step 210, the search criteria are defined for a unit directory search. For this example, the search criteria are the key types and key values corresponding to the node SWVersion and Spec_ID parameters. The search of a first unit directory begins at step 220. The routine searches the first unit directory for the specified configuration ROM for entries corresponding to the Spec_ID at step 240 and returns the entry values which are located using this search parameter at step 250. The routine then searches the first unit directory for the specified configuration ROM for entries corresponding to the software version number at step 270 and returns the entry values which are located using this search parameters at step 280. As discussed above, these values can be used to load the appropriate driver software. At step 290, the search moves to the next unit directory within the prescribed CSR configuration ROM and the retrieval process continues until the entire CSR configuration ROM has been searched. When the address space has been searched completely, the Done parameter will be set to true. The search routine checks the Done parameter at step 230. When Done is true, the process quits at step 300.

One example of when the search routine described above may be utilized in computer system 5 is during initialization. At start-up, firmware or software residing in computer system 5 (e.g., within a ROM associated with CPU 10) will generally construct a device tree. Those skilled in the art will appreciate that a device tree is a database stored in computer memory which represents the device topology of computer system 5. The device tree generally corresponds to the name registry described above and contains information regarding the various nodes which, for example, allows the appropriate driver software for the nodes to be loaded. The initialization firmware or software could call the above-described search routine as part of the process for creating such a device tree. The search routine would return with the various node spec_IDs and software version parameters which could then be stored in memory as part of the device tree. In this way, computer system 5 would be provided with sufficient information to load the appropriate driver software for the nodes on the bus.

A more general search routine which could be implemented in accordance with the present invention would begin with a call to create an iterator as shown below.

```
CSRROMCreateIterator    (
    CSRROMEntryIterator     *pCSRROMIterator
    Reference ID            referenceID);
    pCSRROMIterator         Pointer to iterator used by the
                            iterate and search routines.
    Reference ID            Reference to node to search in.
```

This routine creates an iterator and returns it in pCSR-ROMIterator to be used by the search routine. The iterator may be initialized to a default starting entry at the beginning of the CSR configuration ROM root directory (see FIG. 3) with an appropriate search direction.

The process of initializing the iterator, i.e., defining a starting address for the search and a direction for the search, can be accomplished as follows. First, the initialization routine would call a routine such as:

CSRROMSetIterator (CSR ROMEntryIterator, pEntryID, relationship)

This routine would return an iterator (CSRROMEntryIterator) with a defined starting address (pEntryID). The starting address can be the initial address of the CSR configuration ROM of the root directory or can correspond to any other directory entry of the CSR ROM.

The above routine also defines a search direction using the parameter "relationship." Recall that the CSR configuration ROMs have a hierarchical structure as shown in FIG. 3. The "relationship" parameter defines which directories will be searched in relation to the entry address for the search. For example, if the search routine will be called upon to search all of the directories of a specified node CSR ROM, the iterator should be set to start the search at the root directory (defined by the address passed as pEntryID) and search all descendent directories of the root directory. Alternatively, if the search routine will be called upon only to search a particular unit directory and its child directories, the iterator should be set to start at the unit directory of interest and the search direction set only for that directory's direct children. The "relationship" parameter allows such diversity.

An exemplary set of relationship parameters for the search direction is as follows.

```
enum
{
    kIterateContinue     =1,
    kIterateRoot         =2,
    kIterateParents      =3,
    kIterateChildren     =4,
    kIterateDescendants  =5,
    kIterateSibling      =6,
};
    kIterateContinue     Continue iterating in previously specified
                         direction.
    kIterateRoot         Start iterating from the root.
    kIterateParents      Include all parents of entry.
    kIterateChildren     Include all children of entry.
    kIterateDescendants  Include all descendents of entry.
    KIterateSibling      Include all siblings of entry.
```

The more general search routine then would be:

```
CSRROMEntrySearch      (
    CSRROMEntryIterator      csrROMEntryIterator,
```

-continued

```
    CSRROMIterationOp        relationship,
    CSRROMEntryID            *pEntryID,
    Boolean                  *pDone,
    CSRROMSearchCriteriaPtr  pSearchCriteria,
    Ptr                      pEntryValue,
    UInt32                   pEntrySize;
→   csrROMEntryIterator      Iterator used to create iterate and
                             search routines.
→   relationship             Search direction.
←   pEntryID                 ID of next entry found.
←   pDone                    true means searching is complete.
→   pSearchCriteria          Criteria used for searching.
←   pEntryValue              Value of entry that was found.
←→  pEntrySize               Size of above value.
```

This search routine searches for a CSR configuration ROM entry that matches the given search criteria and returns the entry ID of the entry indicated by pEntryID or returns true in pDone if all matching entries have been found. The routine optionally returns the value of the entry indicated by pEntryValue if pEntryValue and pEntrySize are not nil. It will copy as many bytes of the entry value as are specified in pEntrySize and return the number of bytes in pEntrySize.

The search routine compares each entry against the criteria indicated by pSearchCriteria according to the csrROM-SearchType in pSearchCriteria. An exemplary data structure for the search criteria is shown below.

```
struct   CSRROMSearchCriteriaStruct
{
         UInt32                   csrROMSearchType;
         UInt32                   keyType;
         UInt32                   keyHi,
                                  keyLo;
};
typedef  struct                   CSRROMsearchCriteria
         CSRROMSearchCriteriaStruct
                                  *CSRROMSearchCriteriaPtr;
         csrROMSearchType         Type of search criteria record.
         keyType                  Types of keys to search for.
                                  Can be any combination of
                                  key types.
         keyHi, keyLo             Key values to search for.
                                  Each key value is represented
                                  by the bit position in either
                                  keyHi or keyLo. Can be any
                                  combination of key values.
```

The csrROMSearchType will generally be a "key search" (as shown above for the simple search), with the key values corresponding to particular directory entries and key types as shown in Table 1. The following constants define the key type bits to use in the key Type field in the CSRROMSearch-Criteria record:

```
enum
{
    kCSREveryKeyType         = 0xFFFFFFFF,
    kCSRImmediateKeyTypeBit  = (1 << kSCRImmediateKeyType),
    kCSROffsetKeyTypeBit     = (1 << kCSROffsetKeyType),
    kCSRLeafKeyTypeBit       = (1 << kCSRLeafKeyType),
    kCSRDirectoryKeyTypeBit  = (1 << kCSRDirectoryKeyType),
};
```

The following constants define the standard CSR configuration ROM key values:

```
enum
{
        kCSRTextualDescriptorKey        = 0x01,
        kCSRBusDependentInfoKey         = 0x02,
        kCSRModuleVendorIDKey           = 0x03,
        kCSRModuleHwVersionKey          = 0x04,
        kCSRModuleSpecIdKey             = 0x05,
        kCSRModuleSwVersionKey          = 0x06,
        kCSRModuleDependentInfoKey      = 0x07,
        kSCRNodeVendorIDKey             = 0x08,
        kCSRNodeHwVersionKey            = 0x09,
        kCSRNodeSpecIdKey               = 0x0A,
        kCSRNodeSwVersionKey            = 0x0B,
        kCSRNodeCapabilitiesKey         = 0x0C,
        kCSRNodeUniqueIdKey             = 0x0D,
        kCSRNodeMemoryExtentKey         = 0x0E,
        kCSRNodeDependentInfoKey        = 0x10,
        kCSRUnitDirectoryKey            = 0x11,
        kCSRUnitSpecIdKey               = 0x12,
        kCSRUnitSwVersionKey            = 0x13,
        kCSRUnitDependentInfoKey        = 0x14,
        kCSRUnitLocationKey             = 0x15,
        kCSRUnitPollMaskKey             = 0x16,
};
```

The following constants define the key value bits to use in the keyHi and keyLo fields in the CSRROMSearchCriteria record;

```
enum
{
        kCSREveryKey                    = 0xFFFFFFFF,
        kCSRTextualDescriptorKeyBit     = (1 << kCSRTextualDescriptorKey),
        kCSRBusDependentInfoKeyBit      = (1 << kCSRBusDependentInfoKey),
        kCSRModuleVendorIDKeyBit        = (1 << kCSRModuleVendorIDKey),
        kCSRModuleHwVersionKeyBit       = (1 << kCSRModuleHwVersionKey),
        kCSRModuleSpecIdKeyBit          = (1 << kCSRModuleSpecIdKey),
        kCSRModuleSwVersionKeyBit       = (1 << kCSRModuleSwVersionKey),
        kCSRModuleDependentInfoKeyBit   = (1 << kCSRModuleDependentInfoKey),
        kCSRNodeVendorIdKeyBit          = (1 << kCSRNode VendorIdKey),
        kCSRNodeHwVersionKeyBit         = (1 << kCSRNodeHwVersionKey),
        kCSRNodeSpecIdKeyBit            = (1 << kCSRNodeSpecIdKey),
        kCSRNodeSwVersionKeyBit         = (1 << kCSRNodeSwVersionKey),
        kCSRNodeCapabilitiesKeyBit      = (1 << kCSRNodeCapabilitiesKey),
        kCSRNodeUniqueIdKeyBit          = (1 << kCSRNodeUniqueIdKey),
        kCSRNodeMemoryExtentKeyBit      = (1 << kCSRNodeMemoryExtentKey),
        kCSRNodeDependentInfoKeyBit     = (1 << kCSRNodeDependentInfoKey),
        kCSRUnitDirectoryKeyBit         = (1 << kCSRUnitDirectoryKey),
        kCSRUnitSpecIdKeyBit            = (1 << kCSRUnitSpecIdKey),
        kCSRUnitSwVersionKeyBit         = (1 << kCSRUnitSwVersionKey),
        kCSRUnitDependentInfoKeyBit     = (1 << kCSRUnitDependentInfoKey),
        kCSRUnitLocationKeyBit          = (1 << kCSRUnitLocationKey),
        kCSRUnitPollMaskKeyBit          = (1 << kCSRUnitPollMaskKey),
};
```

It will be thus be appreciated by those skilled in the art that although a specific search routine for retrieving node software version numbers and spec__IDs is useful for establishing a Name Registry to load appropriate driver software, the method of the present invention is equally applicable to retrieving any configuration data from a node configuration ROM.

Thus, a method and apparatus for searching CSR configuration ROMs has been described. While the present invention has been described with reference to particular embodiments, one skilled in the art will recognize other embodiments which come within the scope of this invention. It should, therefore, be appreciated that the present invention should not be construed as limited by such embodiments, but rather construed by the below claims.

What is claimed is:

1. A computer implemented method comprising the steps of:

retrieving, from a configuration memory of a first node of computer system having a plurality of nodes interconnected by a bus having one or more communication links, configuration information associated with the first node, the configuration information being identified by a key field used as a search criterion during the retrieval.

2. The computer implemented method of claim 1 wherein the bus has an associated address space within the computer system and wherein the step of retrieving comprises:

recursively searching at least a portion of the address space of the bus, the portion corresponding to the configuration memory associated with the first node.

3. The computer implemented method of claim 2 wherein the step of retrieving further comprises:

generating an iterator, the iterator corresponding to a beginning address within the address space of the bus; and defining the search criterion to identify an entry in the configuration memory associated with the first node, wherein the entry comprises the configuration information.

4. The computer implemented method of claim 3 wherein the step of retrieving further comprises defining a search direction.

5. The computer implemented method of claim 4 wherein the search criterion comprises at least one of a node software version number, a node spec__ID, a node vendor ID, a node unique ID, and a node hardware version number.

6. The computer implemented method of claim 4 wherein the configuration memory associated with the first node comprises a plurality of entries, the entries comprising various configuration information, and wherein the step of retrieving further comprises:

comparing the search criterion to the plurality of entries; and reporting a matching one of the plurality of entries that is identical to the search criterion.

7. A computer system having a processor coupled to a communication bus, a memory coupled to the communication bus, devices coupled to the communication bus, each of the devices having an associated configuration ROM, the memory storing computer readable instructions which, when executed by the processor, cause the processor to perform the computer implemented steps of:

retrieving from the configuration ROM associated with the first of said devices, configuration information regarding the corresponding first device, the configuration information being identified by a key value used as a search criterion during the retrieval.

8. The computer system of claim 7 wherein the bus has an associated address space within the computer system and wherein the memory further stores computer readable instructions associated with the instructions for retrieving which, when executed by the processor, cause the processor to perform the computer implemented steps of:

recursively searching at least a portion of the address space of the bus, the portion corresponding to the configuration ROM associated with the first device.

9. The computer system of claim 8 wherein the memory further stored computer readable instructions associated with the instructions for retrieving which, when executed by the processor, cause the processor to perform the computer implemented steps of:

generating an iterator, the iterator corresponding to a beginning address within the address space of the bus;

defining the search criteria, the search criterion to identify an entry in the configuration ROM associated with the first node, wherein the entry comprises the configuration information.

10. The computer system of claim 9 wherein the computer readable instructions for retrieving further comprise computer readable instructions for defining a search direction.

11. The computer system of claim 10 wherein the computer readable instructions indicating the search criterion comprise computer readable instructions indicating at least one of a node software version number, a node spec_ID, a node vendor ID, a node unique ID, and a node hardware version number.

12. The computer system of claim 10 wherein the configuration ROM associated with the first node comprises a plurality of entries, the entries comprising various configuration information, and wherein the memory further stores computer readable instructions associated with the instructions for retrieving which, when executed by the processor, cause the processor to perform the computer implemented steps of:

comparing the search criterion to the plurality of entries; and reporting a matching one of the plurality of entries that is identical to the search criterion.

\* \* \* \* \*